US011223701B2

(12) United States Patent
Zhou et al.

(10) Patent No.: US 11,223,701 B2
(45) Date of Patent: *Jan. 11, 2022

(54) SYSTEMS AND METHODS FOR BUILDING AND PROVIDING POLYMORPHIC REST SERVICES FOR HETEROGENEOUS REPOSITORIES

(71) Applicant: OPEN TEXT CORPORATION, Waterloo (CA)

(72) Inventors: Wei Zhou, Shanghai (CN); Muhua Chen, Shanghai (CN); Wei Ruan, Shanghai (CN); Chen Wang, Shanghai (CN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,154

(22) Filed: Jan. 26, 2021

(65) Prior Publication Data

US 2021/0152662 A1   May 20, 2021

Related U.S. Application Data

(63) Continuation of application No. 16/854,624, filed on Apr. 21, 2020, now Pat. No. 10,938,953, which is a (Continued)

(51) Int. Cl.
*H04L 29/08* (2006.01)
*G06F 16/25* (2019.01)
(Continued)

(52) U.S. Cl.
CPC .......... *H04L 67/327* (2013.01); *G06F 16/252* (2019.01); *G06F 16/951* (2019.01);
(Continued)

(58) Field of Classification Search
CPC .................................................. H04L 41/5041
(Continued)

(56) References Cited

U.S. PATENT DOCUMENTS

| 9,449,038 B2 | 9/2016 | Gupta |
| 10,223,107 B2 | 3/2019 | Liimatainen |

(Continued)

FOREIGN PATENT DOCUMENTS

| CN | 106156932 | 11/2016 |

OTHER PUBLICATIONS

International Search Report and Written Opinion for PCT/CA2018/050964, dated Oct. 18, 2018, 7 pages.
(Continued)

*Primary Examiner* — Wing F Chan
*Assistant Examiner* — Leon Y Tseng
(74) *Attorney, Agent, or Firm* — Sprinkle IP Law Group

(57) ABSTRACT

Responsive to a request to access heterogeneous repositories, a REST server queries a resource registry to find resources that match mapping information contained in the request. The resource registry returns resource registry tables containing the matching resources. The resource registry tables implement a unified data structure of a resource registry model and are generated at runtime by the resource registry mapping REST service configuration parameters to the fields of the unified data structure. The REST service configuration parameters are added to an extension SDK for REST extension developers to enhance REST service configuration for extension applications. The REST service configuration parameters are configured at implementation time and loaded/scanned into the REST server at runtime. The REST server iteratively evaluates the resource registry tables until all the matching resources have been evaluated. The evaluation result is used to determine (Continued)

whether to reject, accept, or redirect the request from the client device.

20 Claims, 9 Drawing Sheets

Related U.S. Application Data continuation of application No. 16/057,549, filed on Aug. 7, 2018, now Pat. No. 10,652,361.

(60) Provisional application No. 62/543,092, filed on Aug. 9, 2017.

(51) Int. Cl.
*G06F 16/951* (2019.01)
*H04L 12/24* (2006.01)
*H04L 29/06* (2006.01)

(52) U.S. Cl.
CPC .......... *H04L 41/5041* (2013.01); *H04L 67/02* (2013.01); *H04L 67/1097* (2013.01); *H04L 67/322* (2013.01); *H04L 67/40* (2013.01); *H04L 67/42* (2013.01); *H04L 67/2814* (2013.01)

(58) Field of Classification Search
USPC ......................................................... 709/219
See application file for complete search history.

(56) References Cited

U.S. PATENT DOCUMENTS

| | | |
|---|---|---|
| 10,355,940 B2 | 7/2019 | Wolting |
| 10,423,675 B2 | 9/2019 | Daas et al. |
| 10,652,361 B2 | 5/2020 | Zhou et al. |
| 10,938,953 B2 | 3/2021 | Zhou |
| 2014/0129457 A1 | 5/2014 | Peeler |
| 2016/0308949 A1 | 10/2016 | Zhou et al. |
| 2017/0171104 A1 | 6/2017 | Zhou et al. |
| 2018/0322168 A1 | 11/2018 | Levine |
| 2020/0252482 A1 | 8/2020 | Zhou et al. |

OTHER PUBLICATIONS

International Preliminary Report on Patentability for PCT/CA2018/050964, dated Feb. 20, 2020, 5 pages.
Notice of Allowance for U.S. Appl. No. 16/854,624, dated Oct. 22, 2020, 6 pages.
European Search Report for EP Patent Application No. 18843604.2 dated Dec. 15, 2020, 8 pgs.

FIG. 3

| Resource | Scope | Mode | Alternate |
|---|---|---|---|
| format | * | exclusion | - |
| formats | * | exclusion | - |
| type | acmeX \| acmeY | exclusion | - |
| types | core | exclusion | - |

```
disabling-resource-registry:
 - resources: [type]
   repository-scope: [acmeX, acmeY]
 - resources: [formats, format]
 - resources: [types]
   repository-scope: [core]
```

FIG. 4

| Resource | Scope | Mode | Alternate |
|---|---|---|---|
| my-lifecycles | acmeX \| acmeY | inclusion | lifecycle |
| lifecycles | acmeX \| acmeY | exclusion | - |
| peer-relations | * | inclusion | - |
| relations | * | exclusion | - |

```
override-resource-registry:
 - new: peer-relations
   origin: relations
 - new: my-lifecycles
   origin: lifecycles
   repository-scope: [acmeX, acmeY]
```

FIG. 5

| Resource | Scope | Mode | Alternate |
|---|---|---|---|
| my-checkedout | acmeX | inclusion | - |
| my-cabinets | acmeY | inclusion | cabinets |
| cabinets | acmeY | exclusion | - |

```
@Controller("my-checkedout")
@RequestMapping("/repositories/{repoId}/my-locked")
@RestControllerScope(repositoryScope = "acmeX")
public class MyCheckedOutObjectsController @Controller("my-cabinets")
@RequestMapping("/repositories/{repoId}/my-cabinets")
@RestControllerScope(repositoryScope = "acmeY",
   overrideResource = "cabinets")
public class MyCabinetsController
```

FIG. 8

| Resource | Scope | Mode | Alternate |
|---|---|---|---|
| group-relations | acmeX | inclusion | team-relations |
|  | acmeY | inclusion | team-relations |
| team-relations | acmeX | inclusion | peer-relations |
|  | acmeX | exclusion |  |
|  | acmeY | exclusion |  |
|  | acmeZ | inclusion | peer-relations |
| peer-relations | acmeX | exclusion |  |
|  | acmeZ | exclusion |  |
|  | * | inclusion |  |
| relations | * | exclusion |  |

```
override-resource-registry:
- new: peer-relations
  origin: relations

- new: team-relations
  origin: peer-relations
  repository-scope: [acmeX, acmeZ]

- new: group-relations
  origin: team-relations
  repository-scope: [acmeX, acmeY]
```

FIG. 9

| Resource | Scope | Mode | Alternate |
|---|---|---|---|
| my-relations | acmeX | inclusion | * |
|  | acmeY | inclusion | relations |
| relations | acmeY | exclusion |  |

```
@Controller("my-relations")
@RequestMapping("/repositories/{repoId}/my-relations")
@RestControllerScope(repositoryScope = "acmeX")
public class MyCheckedOutObjectsController override-resource-registry:
- new: my-relations
  origin: relations
  repository-scope: [acmeY]
```

SYSTEMS AND METHODS FOR BUILDING AND PROVIDING POLYMORPHIC REST SERVICES FOR HETEROGENEOUS REPOSITORIES

CROSS-REFERENCE TO RELATED APPLICATIONS

This application is a continuation of, and claims a benefit of priority under 35 U.S.C. § 120 from, U.S. patent application Ser. No. 16/854,624, filed Apr. 21, 2020, entitled "SYSTEMS AND METHODS FOR BUILDING AND PROVIDING POLYMORPHIC REST SERVICES FOR HETEROGENEOUS REPOSITORIES," issued as U.S. Pat. No. 10,938,953, which is a continuation of, and claims a benefit of priority under 35 U.S.C. § 120 from, U.S. patent application Ser. No. 16/057,549, filed Aug. 7, 2018, entitled "SYSTEMS AND METHODS FOR BUILDING AND PROVIDING POLYMORPHIC REST SERVICES FOR HETEROGENEOUS REPOSITORIES," issued as U.S. Pat. No. 10,652,361, which claims a benefit of priority under 35 U.S.C. § 119(e) from U.S. Provisional Application No. 62/543,092, filed Aug. 9, 2017, entitled "SYSTEMS AND METHODS FOR BUILDING AND PROVIDING POLYMORPHIC REST SERVICES FOR HETEROGENEOUS REPOSITORIES," all of which are fully incorporated by reference herein for all purposes.

TECHNICAL FIELD

This disclosure relates generally to the field of enterprise content management. More particularly, this disclosure relates to content services provided by an enterprise content management platform. Even more particularly, embodiments disclosed herein relate to systems, methods, and computer program products for building and providing polymorphic Representational State Transfer (REST) services on an enterprise content management platform for accessing heterogeneous content repositories.

BACKGROUND OF THE DISCLOSURE

Enterprise content management (ECM) generally refers to a dynamic combination of strategies, methods, and tools (collectively referred to herein as the "ECM technology") used to capture, manage, store, preserve (archive), and deliver information supporting a company, organization, or enterprise's processes throughout the information's lifecycle (e.g., from creation to deletion or destruction). The ECM technology can be utilized to organize all the content that gets used and distributed in an enterprise (referred to herein as "enterprise content"). In this case, "enterprise content" can be documents, files, images, audios, videos, emails, drawings, and any other unstructured enterprise-owned and/or related information (collectively referred to herein as "content").

While content can be stored in files on an enterprise's network drive or file system in the enterprise's network (e.g., an Intranet or a secure private network), increasingly, content repositories are used. A content repository refers to a computer storage in which an aggregation of data is kept and maintained in an organized way. The ECM technology can be used to sort, control (e.g., regulate), manage, label, route, and locate content stored in such repositories. An ECM solution refers to a particular way the ECM technology is implemented to make content searchable, manage version control, perform routing and workflows, etc.

An example of an ECM solution can be Documentum™, available from OpenText™, which is headquartered in Canada. This ECM solution provides a rich set of out-of-the-box (OOTB) content services for enterprise users to access content servers, content repositories, or the like through REST application programming interfaces (APIs).

REST defines a set of architectural principles by which Web services can be created to focus on a system's resources, including how resource states are addressed and transferred over Hypertext Transport Protocol (HTTP) by a wide range of clients written in different languages. An ECM solution can include a REST extension software development kit (SDK) that provides application developers/designers with the extension point to add custom resources, disable OOTB resources, or override OOTB resources in their custom ECM applications (collectively referred to herein as "extension applications") that utilize content repositories on the server side.

An example of REST extension methods and apparatus can be found in U.S. Patent Application Publication No. 2016/0308949 A1 and Chinese Patent Publication No. CN106156932A, both of which are incorporated by reference herein. Examples of extension applications can include OpenText Documentum D2, OpenText Capital Projects Solutions, etc.

SUMMARY OF THE DISCLOSURE

As discussed above, ECM extension application developers can utilize an extension SDK to build custom REST services. Once an extended service is deployed, the customization permanently and statically takes effect during the lifetime of a running REST instance. This becomes a technological limitation when an extension application is provisioning a repository by its own configurations and is requiring an API to be adaptive to the repository type(s).

Embodiments of a technical solution for building and providing polymorphic REST services disclosed herein can address the aforementioned technological limitation and provide additional technical solutions and benefits. This new solution provides ECM extension application developers with a new ability to build a REST extension at the client side and, at the server side, provides a REST server framework including a REST server with a new ability to decide, by itself and inside the REST server's internal request handling, whether a resource customization should be applied to an incoming REST request.

For example, at the client side, special YAML configuration parameters can be included in a new REST extension SDK (which, as a non-limiting example, can be written in YAML). YAML stands for "YAML Ain't Markup Language" and is a human-friendly data serialization standard for all programming languages. YAML is both human readable and computationally powerful. Technically, YAML is a superset of JavaScript Object Notation (JSON), which is an open-standard file format that uses human-readable text to transmit data objects consisting of attribute-value pairs and array data types (or any other serializable value). The YAML specification is available from yaml.org at <http://www.yaml.org/spec/> and thus is not further described herein.

The REST extension configuration parameters (e.g., YAML configuration parameters), which are further explained below, enable ECM extension application developers to customize their REST APIs. For instance, when developing an extension application, an ECM extension application developer can configure the YAML configuration parameters in the REST extension SDK to determine, for instance, which resources are to be disabled, overridden, or added in a REST extension project, with repository scopes (types). YAML configuration parameters thus configured may be found in a YAML configuration file or annotated in the extension application's Java code (which can include multiple files).

At the server side, the REST server may receive a request from an extension application thus built. Resources available for servicing the request are provisioned at runtime per the extension application's resource configuration and depending upon the type of the repository targeted by the request. The polymorphism of such REST services can overcome the aforementioned technological limitation in which an extension application's resource customization permanently and statically takes effect during the lifetime of a running REST instance.

In this case, the REST server is operable to find resources utilizing mapping information contained in the request. Examples of mapping information can include universal resource identifiers (URIs), query parameters, HTTP headers, media types, etc. The REST server may send a query for resource information to a resource registry (which is part of the REST server framework).

The resource registry is operable to respond to the query from the REST server with a set of resource registry tables containing "scoped" resources. The scoped resources represent, out of all the resources of provisioned and/or non-provisioned repositories communicatively connected to the REST server, a subset of resources that are potentially available to service this particular REST request.

In some embodiments, the resource registry tables are generated and/or updated by the resource registry utilizing the REST server's internal resource registry model and the extension application's resource customization (e.g., the YAML configuration parameters configured by the extension application's developer and provided to the REST server framework at implementation time). The resource registry model, which is created internally at runtime by the REST server, has a unified data structure and governs all registered resource endpoints, including OOTB resources and any newly provisioned (e.g., modified or customized) resources. In this way, all the scoped resources can be described uniformly. The resource registry stores resource registry tables thus generated/updated in memory for internal use by the REST server.

The REST server is operable to iteratively evaluate the resource registry tables returned by the resource registry until all the matching resources have been evaluated. Based on the evaluation result from this iterative evaluation process, the REST server is operable to determine how the request is to be handled (e.g., reject the request, accept the request, or redirect the request). In this way, when a REST request comes to the REST server, the REST server can intelligently decide whether to accept, redirect, or reject the request. A technical effect here is that a single REST server instance can access existing, non-provisioned repositories as well as newly provisioned repositories.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 3-9 illustrate by example how various YAML configurations can be mapped to a resource registry model having a unified data structure according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
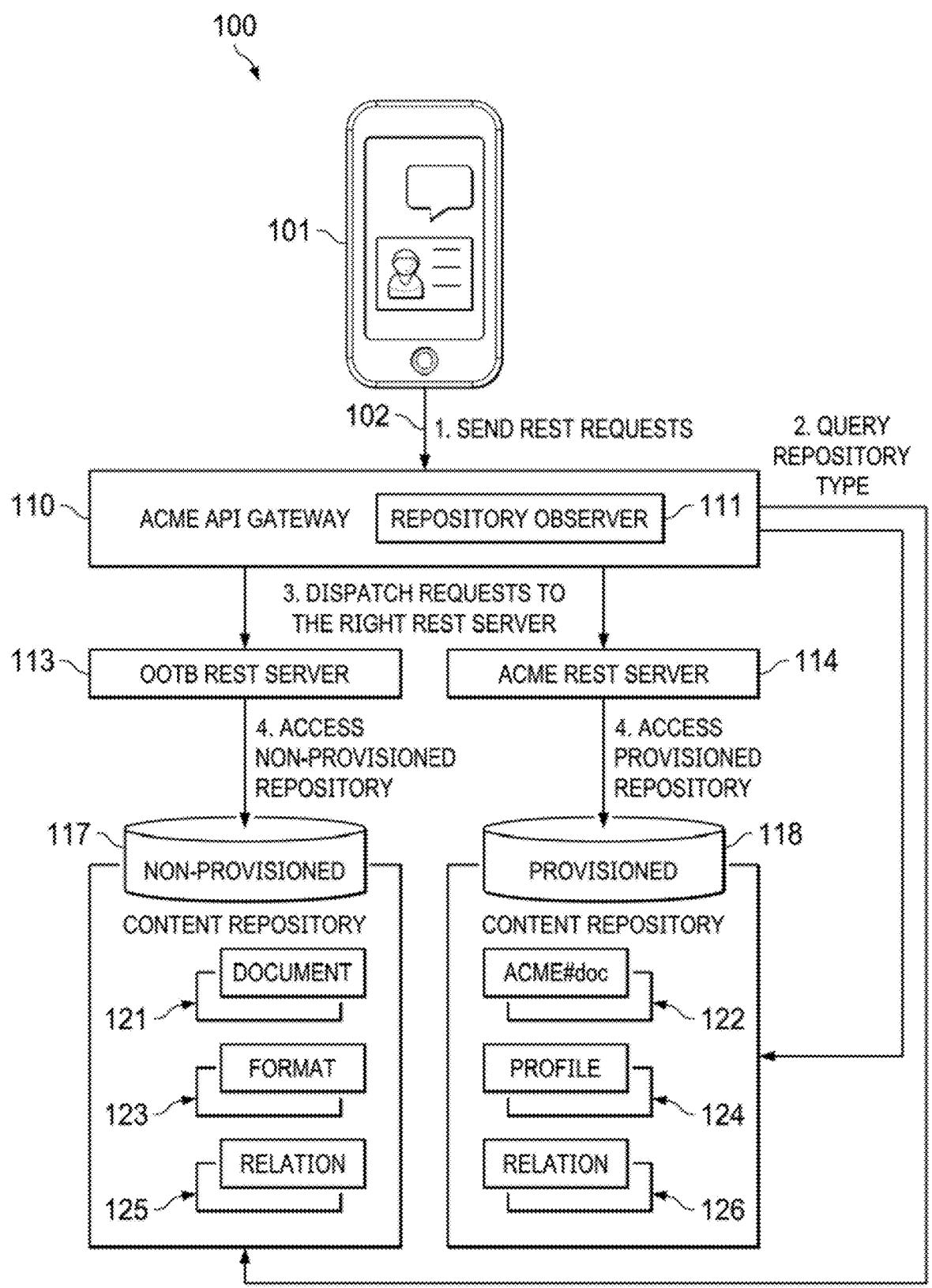
FIG. 1 depicts a diagrammatic representation of an example of an enterprise computing environment in which REST requests to access disparate, heterogeneous content repositories are first processed by an API gateway which then dispatches the incoming REST requests to discrete REST servers, each specifically configured for handling REST requests for a particular content repository.

FIG. 1 depicts a diagrammatic representation of an enterprise computing environment (e.g., enterprise computing environment 100) in which REST requests (e.g., REST request 102 from computing device 101) to access disparate, heterogeneous content repositories (e.g., Content Repository 117, Content Repository 118) are first processed by an API gateway (e.g., ACME API Gateway 110). Using a built-in repository observer (e.g., Repository Observer 111), the API gateway then dispatches the incoming REST requests to discrete REST servers (e.g., OOTB REST Server 113, ACME REST Server 114), each specifically configured for handling REST requests for a particular content repository.

In the example of FIG. 1, Content Repository 117 may represent a default or non-provisioned content repository, while Content Repository 118 may represent a provisioned content repository. "Non-provisioned," in this sense, can mean that Content Repository 117 is not specifically set up for the API gateway and/or the application from which the REST request is originated. Even so, the OOTB REST Server 113 can still service REST requests to access Content Repository 117. As a non-provisioned content repository, Content Repository 117 may store various types of objects referred to herein as "resources" in OOTB data structures (e.g., document objects 121, format objects 123, relation objects 125, etc.).

Content Repository 118 may be owned and operated by a company, say, "ACME." ACME may have deep-provisioned (set up in depth) Content Repository 118 as follows:
  OOTB document resources have been overridden with ACME's proprietary logic (e.g., instead of storing documents in a directory "/documents," ACME's proprietary logic stores documents as ACM E #doc resources 122 in a different directory "/acme-docs").
  Access to OOTB format resources has been disabled.
  Unique profile resources (e.g., profile resources 124) have been created.
  OOTB relation resources have been reused (e.g., as relation resources 126).

As a result of this provisioning by ACME, resources provided by the provisioned Content Repository 118 cannot be accessed the same way as the non-provisioned Content Repository 117. That is, a client device cannot access both the provisioned Content Repository 118 and the non-provisioned Content Repository 117 using the same API.

With the Documentum REST extension SDK, ACME can develop and build ACME REST services upon the OOTB REST services in provisioning custom repositories for ACME, for instance, by composing custom ACME REST APIs and deploying them to the custom repositories. A REST API is a "shared" service in that it is shared by many clients. Thus, a REST API cannot be changed. Because a REST API cannot be changed, it cannot adapt to new and/or different repositories.

Suppose ACME is or grows into a large company. As a large company, it is highly possible that not all content repositories in ACME are provisioned by the additional configuration described above. These content repositories can be in different types (e.g., feature 1 vs. feature 2) and have different behaviors. Some content repositories may still be used as non-provisioned repositories. Further suppose ACME builds uniform client applications (e.g., extension applications that utilize the ECM technology) which access both provisioned repositories and non-provisioned repositories. When these client applications (which are also referred to herein as "clients") want to access different types of content repositories, they would need to access different REST services instances as well. Unfortunately, previous REST extension methods and apparatus do not adequately address the scenario in which a company or enterprise may deploy multiple, heterogeneous content repositories.

As illustrated in the example of FIG. 1, one possible approach to handling REST requests for resources provided by multiple, heterogeneous content repositories may entail making clients navigate to the right REST server and content repositories. However, due to their disparate, heterogeneous configurations, this approach requires ACME to implement an API gateway (e.g., ACME API Gateway 110) between clients (e.g., client device 101) and REST servers (e.g., OOTB REST Server 113, ACME REST Server 114). Further, it requires a repository observer (Repository Observer 111) to be implemented within the API gateway so the API gateway can decide which REST request should be directed to which REST server.

This approach has several drawbacks. For example, any workarounds at the enterprise level (in this example, within enterprise computing environment 100 owned and operated by ACME) to build REST services for such a scenario can be prohibitively expensive (in terms of time, computational resources, cost, manpower, etc.), at least because the API gateway has become a mandatory component. Without the API gateway, incoming REST requests will not be routed to the right repositories and APIs may be abused.

Further, as discussed above, to prepare the knowledge to detect repository types, a repository observer would need to be implemented on the API gateway. As exemplified in FIG. 1, this implementation requirement makes the underlying architecture very complex and the maintenance effort is high.

Moreover, with this approach, resource usages with multiple REST instances are not optimized and at least two REST servers would need to be running at any time. This means that, if there are M repository types, the REST server count would need to be M+N where N is the count of REST server replications and N>=0. Accordingly, the implementation and maintenance cost of this approach would be excessively high for any enterprise (e.g., ACME in the above example).

Figure 2:
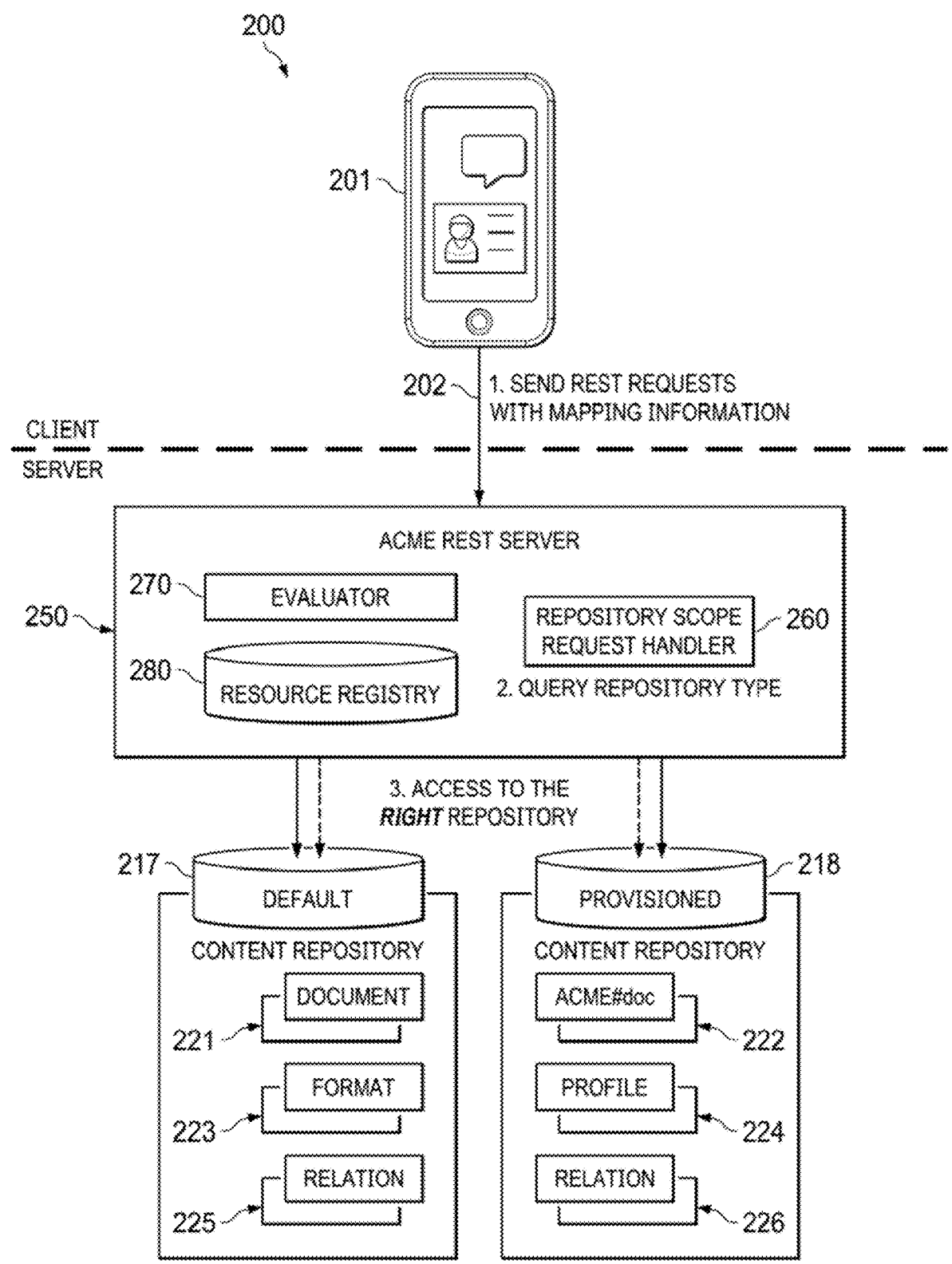
FIG. 2 depicts a diagrammatic representation of an example of an enterprise computing environment in which REST requests to access disparate, heterogeneous content repositories are processed by a new REST server which, according to some embodiments, is particularly configured for intelligently determining whether to accept, redirect, or reject the REST requests.

FIG. 2 depicts a diagrammatic representation of an enterprise computing environment (e.g., enterprise computing environment 200) in which REST requests (e.g., REST request 202 from computing device 201) to access disparate, heterogeneous content repositories (e.g., non-provisioned or default Content Repository 217, provisioned Content Repository 218) are processed by a new REST server (e.g., ACME REST Server 250). In embodiments disclosed herein, a single instance of the new REST server can intelligently determine whether to accept, redirect, or reject REST requests for multiple, heterogeneous repositories, without requiring an API gateway and/or needing multiple REST servers.

As illustrated in FIG. 2, Content Repository 217 may store resources 221, 223, 225 in OOTB data structures similar to those discussed above with reference to Content Repository 117 shown in FIG. 1. Following the above example, Content Repository 218 may be owned and operated by ACME and ACME may have made deep provisioning on Content Repository 218, similar to the provisioning of Content Repository 118 described above. Accordingly, Content Repository 218 may store resources 222, 224, 226 in proprietary data structures as provisioned by ACME.

Embodiments of the invention disclosed herein provide new systems, methods, and apparatuses for building and providing, on the new REST server (which is represented by ACME REST Server 250 in FIG. 2), polymorphic REST services for heterogeneous content repositories such that the REST server can intelligently, efficiently, and appropriately decide, by itself, whether enterprise-specific resource customization should be applied to incoming REST requests. In some embodiments, this decision process can be referred to as the REST server's internal request handling flow, which is further described below with reference to FIG. 11.

Before describing the REST server's internal request handling flow in detail, a high-level review of the overall flow illustrated in FIG. 2 may be helpful.

As shown in FIG. 2, ACME REST Server 250 may receive REST request 202 from client device 202 (Step 1). In response to receiving REST request 202 from client device 202, ACME REST Server 250 may operate to query a resource registry model (or, in one embodiment, a target repository) to find out an appropriate repository type (also referred to herein as a "scope") (Step 2). This is further explained below with reference to Request Handler 260.

Based on the queried repository scope, ACME REST Server 250 may operate to decide whether to accept, redirect, or reject REST request 202 (Step 3). In this way, a single REST server instance on ACME REST Server 250 is able to access both OOTB repositories (e.g., default Content Repository 217) and enterprise-specific repositories (e.g., provisioned Content Repository 218).

To illustrate this process, suppose the following sample REST requests are received at ACME REST Server 250. In this example, each requested sample resource is identified by a URI (e.g., a string of characters used to identify a resource).

Sample REST request for "URI /relations":

In this case, the "relations" resource is implemented by an OOTB REST API to the default Content Repository 217 and reused by the provisioned Content Repository 218. Therefore, both Content Repositories 217 and 218 can service REST requests for "relations." Again, in this example, one repository (Content Repository 218) is provisioned by ACME and the other one (Content Repository 217) is not. Thus, as explained before, they cannot be accessed using the same API.

Sample REST request for "URI /formats":

In this case, the "formats" resource is implemented by an OOTB REST API to the default Content Repository 217 but is disabled by a REST extension to the provisioned Content Repository 218. Therefore, if Content Repositories 217 is the target repository of a REST request for "URI /formats," ACME REST Server 250 will service the REST request for "URI /formats." However, if the provisioned Content Repository 218 is the target repository, ACME REST Server 250 will reject the REST request for "URI /formats" with a message (e.g., "404 Not Found").

Sample REST request for "URI /profiles":

In this case, the "profiles" resource is implemented by a REST extension to the provisioned Content Repository 218 but is not implemented by the default Content Repository 217. Therefore, if the provisioned Content Repository 218 is the target repository of a REST request for "URI /profiles," ACME REST Server 250 will service the REST request for "URI /profiles." However, if the default Content Repository 217 is the target repository, ACME REST Server 250 will reject the REST request for "URI /profiles" with a message (e.g., "404 Not Found").

Sample REST request for "URI /documents":

In this case, the "documents" resource is implemented by an OOTB REST API to the default Content Repository 217 but is overridden by a REST extension to the provisioned Content Repository 218. On the one hand, if the default Content Repository 217 is the target repository of a REST request for "URI /documents," ACME REST Server 250 will service the REST request for "URI /documents" by directing it to "/documents" at default Content Repository 217. On the other hand, if the provisioned Content Repository 218 is the target repository for the REST request for "URI /documents," ACME REST Server 250 will service the REST request for "URI /documents" by directing it to "/acme-docs" at the provisioned Content Repository 218.

Sample REST request for "URI /acme-docs":

In this case, the "acme-docs" resource is implemented by a REST extension to override an OOTB REST "documents" resource. On the one hand, if the provisioned Content Repository 218 is the target repository for a REST request for "URI /acme-docs," ACME REST Server 250 will service the REST request for "URI /acme-docs" by directing it to "/acme-docs" at the provisioned Content Repository 218. On the other hand, if the default Content Repository 217 is the target repository for the REST request for "URI /acme-docs," ACME REST Server 250 will service the REST request for "URI /acme-docs" by directing it to "/documents" at the default, non-provisioned Content Repository 217.

By any request, ACME REST Server 250 can query the target repository type and, by doing so, gain knowledge on whether a requesting resource is available to the target repository. The ability of ACME REST Server 250 to determine which URI to reject, accept, or redirect as demonstrated above can be based on knowledge gained by ACME REST Server 250 both at implementation time and at run time.

At implementation time, REST extension SDK users (e.g., REST extension developers or extension application developers) can customize a REST API by specifying particular YAML configuration parameters in the REST extension SDK. This produces an enhanced REST extension configuration.

For example, a REST extension developer can define which resources are to be disabled and in which repository scope(s) such resources are to be disabled.

Sample YAML configuration parameters for a repository-scope-based configuration for disabling resources can be as follows:

"disabling-resource-registry:
    resources: [formats, format]//disable resources in scope acme1 or acme2
    repository-scope: [acme1, acme2]
    resources: [types]//always disable resources
    resources: [lifecycles]//disable resources in scope core (default)
    repository-scope: [core]"

As another example, a REST extension developer can define which resources are to be overridden and in which repository scope(s) such resources are to be overridden.

Sample YAML configuration parameters for a repository-scope-based configuration for overriding resources can be as follows:

"override-resource-registry:
    new: acme-docs //over resources in scope acme1 or acme2
    origin: documents
    repository-scope: [acme1, acme2]
    new: profiles //new resources in scope acme1
    origin:
    repository-scope: [acme1]"

Using the YAML configuration (which, in this example, enhances the REST extension configuration for ACME), REST extension developers can determine which resources are to be disabled, overridden, and/or added in their REST extension project, with repository scopes (types) for those resources.

Internally, at runtime, a resource registry model is created. This resource registry model governs all resource endpoints registered with ACME REST Server 250. As explained below, the resource registry model is later used by ACME REST Server 250 (e.g., Evaluator 270) to make decisions in the REST server's internal request handling flow.

A non-limiting example of a resource registry model is provided in Table 1 below:

TABLE 1

Resource Registry Model.

| Name | Description | Value type |
| --- | --- | --- |
| resource | A valid resource name (code) | String |
| scope[R] | Repository scope for the resource. "*" denotes all repositories. "Core" represents default repositories. | String array |
| mode[R] | Repository scope mode:<br>inclusion: the resource is effective in the repository scope.<br>exclusion: the resource is ineffective in the repository scope. | Enumeration<br>inclusion<br>exclusion |
| alternate[R] | Specifies another resource name when the resource does not meet the inclusion condition. This is used by resource overriding. Its value is null when there is not an alternate resource. | String |

[R]indicates repeating.

The enhanced REST extension configuration in the example discussed above (e.g., provided by a REST extension developer at implementation time) can be translated (e.g., by Resource Registry 280 at runtime) into this resource registry model for all the registered (provisioned) resources. Moreover, all OOTB resources can also be described by this resource registry model. In this way, all the scoped resources can be described in a unified data structure, as exemplified in Table 1 above.

As a non-limiting example, suppose an ACME REST extension is enhanced (in Java) as follows:

Overrides Core Document resource

Creates ACME Profiles resource

Disables Core Formats resource

Reuses Core Relations resource

As discussed above, such REST extension enhancements can be included in an extension application's Java code ("annotated Java code" or "Java annotation") or in a YAML configuration file. Below is a non-limiting example of what these enhancements could look like in YAML:

@Controller("acme-document")

@RequestMapping("/repositories/{repoId}/docs/{docId}")

@RestControllerScope(repositoryScope="acme", overrideResource="document")

public class AcmeDocController

@Controller("acme-profiles")

@RequestMapping("/repositories/{repoId}/profiles")

@RestControllerScope(repositoryScope="acme")

public class AcmeProfilesController disabling-resource-registry:

resources: [formats]

repository-scope: [acme]

Here, when the target repository is of the type of ACME (which represents a provisioned repository), all available resource are provisioned per the ACME REST extension configuration. When the target repository is of the type of Core (which represents a non-provisioned repository), available resources are rolled back to default.

This enhanced REST extension configuration can be translated or mapped into the resource registry model, as shown in FIG. 2 below. No duplicated resource name is allowed.

TABLE 2

Sample Runtime Resource Registry Model.

| Resource | Scope | Mode | Alternate |
| --- | --- | --- | --- |
| acme-document | acme | inclusion | document |
| document | acme | exclusion | — |
| acme-profiles | acme | inclusion | — |
| formats | acme | exclusion | — |
| relations | * | inclusion | — |

FIGS. 3-9 further illustrate how various YAML configurations can be mapped or otherwise translated into the unified resource registry model according to some embodiments. This mapping transforms user-specified values (e.g., specified by a REST extension developer using the REST extension SDK) for YAML configuration parameters into field values for the fields defined by the unified resource registry model.

FIG. 3 shows an example of mapping a repository-scope-based YAML configuration for disabling resources to a unified data structure with "Resource," "Scope," "Mode," and "Alternate" fields specified by the resource registry model. In this example, user-specified values "acmeX, acmeY" for a YAML configuration parameter "repository-scope" (for a resource "type") can be transformed into a field value "acmeX|acmeY" for the "Scope" field specified by the resource registry model. Depending on the requested repository scope, a REST request may be handled as follows:

TABLE 3

| Request scope | formats | format | types | type |
| --- | --- | --- | --- | --- |
| acmeX | ✗ | ✗ | ✓ | ✗ |
| acmeY | ✗ | ✗ | ✓ | ✗ |
| acmeZ | ✗ | ✗ | ✓ | ✓ |
| core | ✗ | ✗ | ✗ | ✓ |

FIG. 4 shows an example of mapping a repository-scope-based YAML configuration for overriding resources to the unified data structure with different values for the "Resource," "Scope," "Mode," and "Alternate" fields specified by the resource registry model. Depending on the requested repository scope (e.g., "acmeX," "acmeY," "acmeZ," or "core"), a REST request may be handled as follows:

TABLE 4

| Request scope | my-lifecycles | lifecycles | peer-relations | relations |
|---|---|---|---|---|
| acmeX | ✓ | ✗ | ✓ | ✗ |
| acmeY | ✓ | ✗ | ✓ | ✗ |
| acmeZ | ✗ | ✓ | ✓ | ✗ |
| core | ✗ | ✓ | ✓ | ✗ |

FIG. 5 shows an example of resource scope annotation for overriding existing resources with new resources to the unified data structure of the resource registry model. Again, depending on the requested repository scope, a REST request may be handled as follows:

TABLE 5

| Request scope | my-checkedout | my-cabinets | cabinets |
|---|---|---|---|
| acmeX | ✓ | ✗ | ✓ |
| acmeY | ✗ | ✓ | ✗ |
| acmeZ | ✗ | ✗ | ✓ |
| core | ✗ | ✗ | ✓ |

Figure 6:
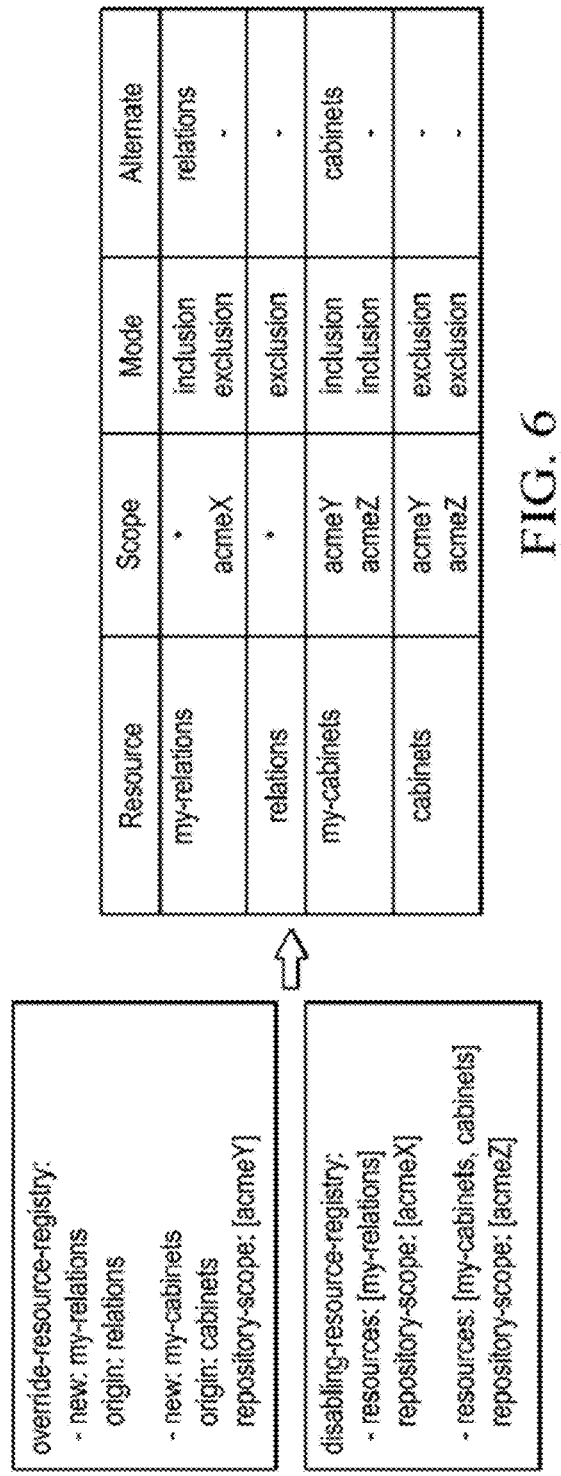

FIGS. 6-9 show more complex examples. FIG. 6 shows an example of mapping a mix of disabling and overriding configuration parameters to the unified data structure of the resource registry model. Traditionally, disabling and overriding REST services cannot be combined as they are implemented separately and have no dependencies. Embodiments disclosed herein allow these formerly separate REST services to work in concert with each other and/or with other components (e.g., REST server components, repository components, etc.), which makes REST services more flexible and versatile for extension application developers. Table 6 below shows show a REST request would be handled using the resource registry model with the mapped disabling and overriding configuration parameters.

TABLE 6

| Request scope | my-relations | relations | my-cabinets | cabinets |
|---|---|---|---|---|
| acmeX | ✗ | ✗ | ✗ | ✓ |
| acmeY | ✓ | ✗ | ✓ | ✗ |
| acmeZ | ✓ | ✗ | ✗ | ✗ |
| core | ✓ | ✗ | ✗ | ✓ |

Figure 7:
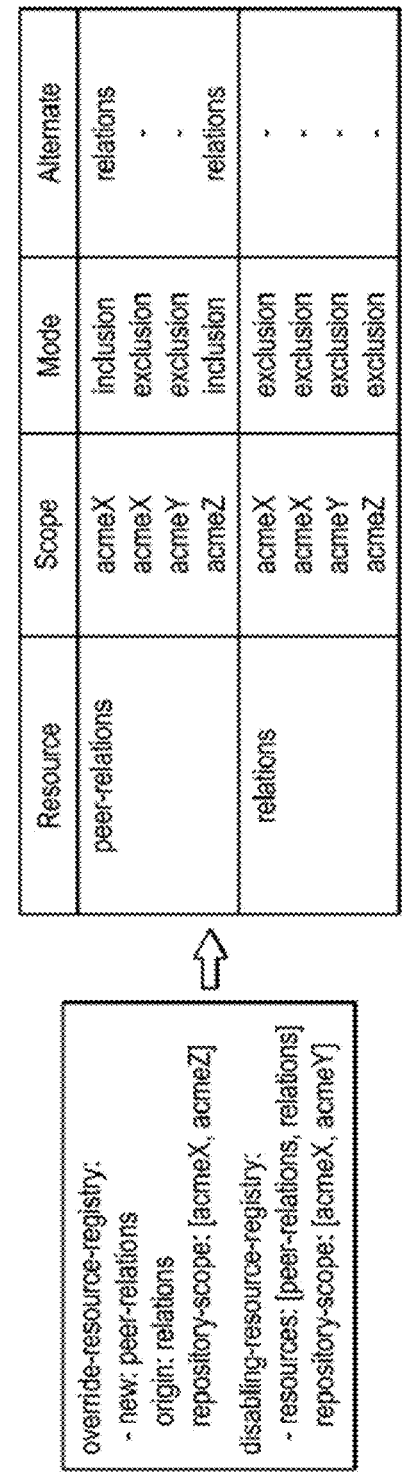

FIG. 7 shows another example of mapping a mix of disabling and overriding configuration parameters to the unified data structure of the resource registry model. Table 7 below shows show a REST request would be handled using the resource registry model with the mapped disabling and overriding configuration parameters.

TABLE 7

| Request scope | peer-relations | relations |
|---|---|---|
| acmeX | ✗ | ✗ |
| acmeY | ✗ | ✗ |
| acmeZ | ✓ | ✗ |
| core | ✗ | ✓ |

FIG. 8 shows yet another example of mapping a complex repository-scope-based YAML configuration the unified data structure specified by the resource registry model. In this example, the repository-scope-based YAML configuration is for overriding chained resources (e.g., overriding resource B will also override resource A).

When overriding chained resources, no circular overriding is allowed. As an example, this can be done by traversing a map representing the chained resources and checking the end points of the map to make sure that none of them had been visited before which would have created a loop in the map. Table 8 below shows show a REST request would be handled using the resource registry model with the mapped configuration parameters for overriding chained resources.

TABLE 8

| Request scope | group-relations | team-relations | peer-relations | relations |
|---|---|---|---|---|
| acmeX | ✓ | ✗ | ✗ | ✗ |
| acmeY | ✓ | ✗ | ✓ | ✗ |
| acmeZ | ✗ | ✓ | ✗ | ✗ |
| core | ✗ | ✗ | ✓ | ✗ |

FIG. 9 shows an example of mapping a mixed repository-scope-based YAM Wava configuration to the unified data structure of the resource registry model. In FIG. 9, the resource "relations" is overridden by the resource "my-relations" but only when the request is scoped to the repository "acmeY." This is shown in Table 9 below.

TABLE 9

| Request scope | my-relations | relations |
|---|---|---|
| acmeX | ✓ | ✓ |
| acmeY | ✓ | ✗ |
| acmeZ | ✗ | ✓ |
| core | ✗ | ✓ |

As alluded to above, the resource registry model can be utilized by ACME REST Server 250 to make decisions on how incoming REST requests should be handled (e.g., accept, direct/redirect, or reject).

Figure 10:
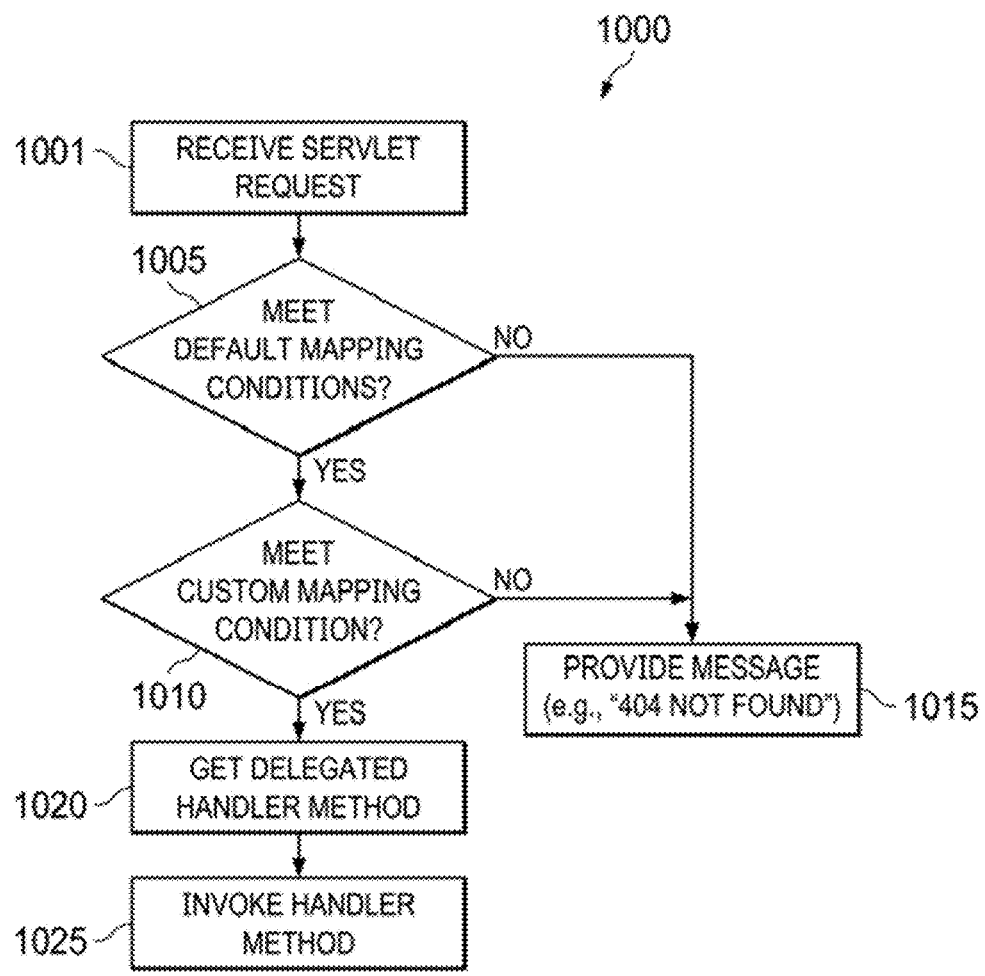
FIG. 10 is a flow diagram illustrating an example of a method for handling a REST request.

FIG. 10 is a flow diagram illustrating an example of a method for handling a REST request. In the example of FIG. 10, process 1000 may begin when a REST request is received by a REST server. A small, server-resident program (servlet) of a server framework operating in an enterprise computing environment (e.g., enterprise computing environment 200) may run automatically in response to an incoming request (e.g., REST request 202 from computing device 201). Responsive to the REST request, the REST server initiates process 1000 which begins to process the REST request (1001).

In this example, process 1000 may first determine whether the REST request meets the REST server's default mapping conditions (1005). If so, process 1000 proceeds to determine whether the REST request meets the REST server's custom mapping conditions (1010). If the REST request does not meet the REST server's default or custom mapping conditions, a message (e.g., "404 not found") is returned (1015). Responsive to the REST request meeting the REST server's custom mapping conditions, process 1000 proceeds to get the delegated handler method configured for handling such REST requests (1020) and invoke the handler method (1025).

Figure 11:
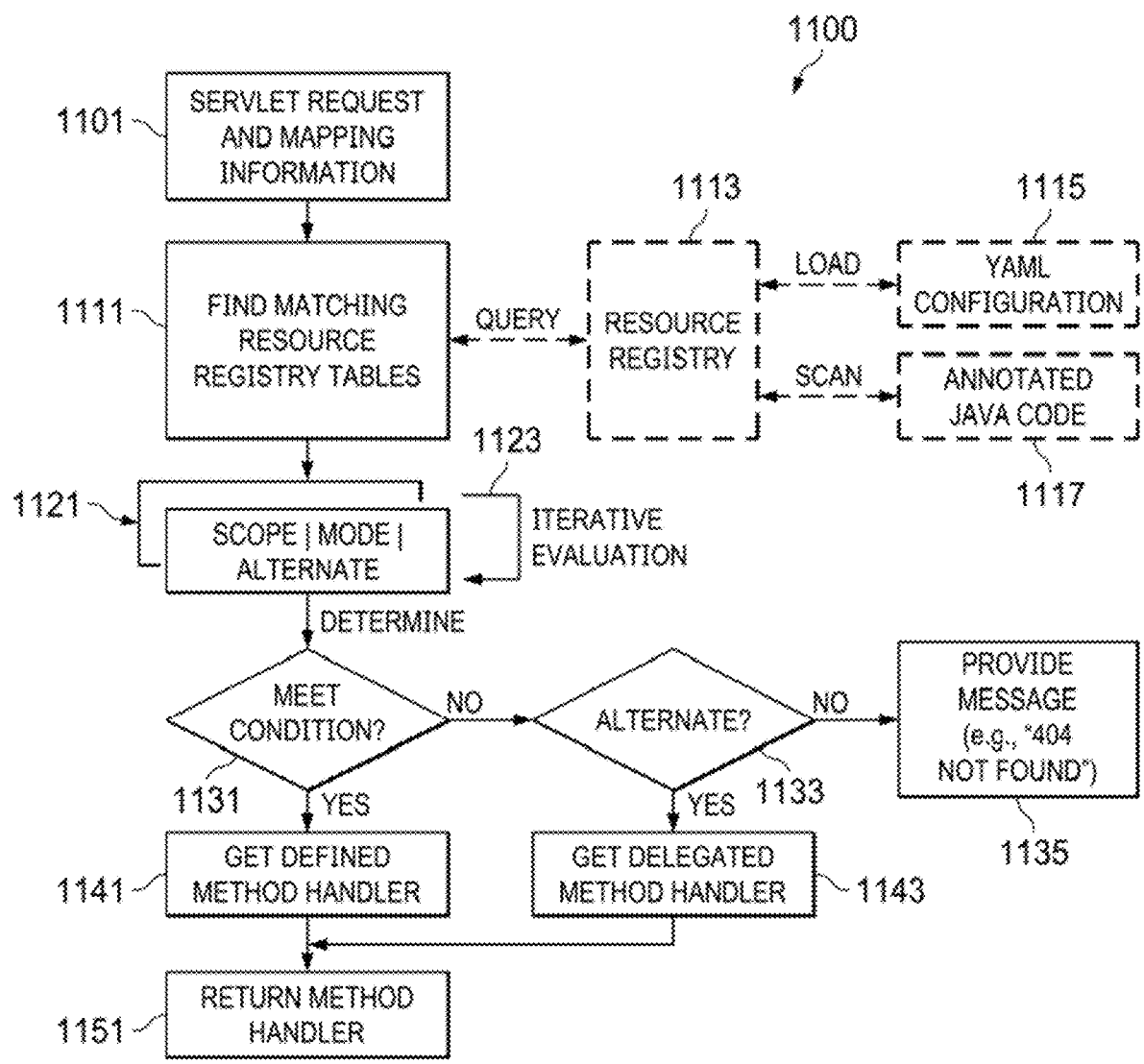
FIG. 11 is a detailed flow diagram illustrating an example of a method for providing polymorphic REST services according to some embodiments.

FIG. 11 is a flow diagram illustrating an example of a method for handling a REST request according to some embodiments. In the example of FIG. 11, process 1100 may begin when a REST request containing mapping information (e.g., a target repository) is received (e.g., through a servlet) by a REST serve implementing an embodiment disclosed herein (e.g., ACME REST Server 250 shown in FIG. 2). Responsive to the REST request, the REST server initiates process 1100 and begins to process the REST request (1101).

The REST request may include resource URIs, query parameters, HTTP headers, media types, etc. In operation, the REST server finds all the matching resources based on the resource URIs, query parameters, HTTP headers, media types, etc. indicated in the REST request (1111). As illustrated in FIG. 11, this may entail the REST server querying a resource registry (e.g., resource registry 280 shown in FIG. 2) (1113).

request. The resource registry stores these resource registry tables in memory for use by the REST server.

Responsive to the REST server's query, the resource registry returns a set of resource registry tables containing resources that match the REST request. The REST server may then operate to iteratively evaluate each resource registry table 1121 (which represents a runtime resource registry model such as the example shown in Table 2) until all the matching resources have been evaluated (1123). A more detailed example of the iterative evaluation logic is described below with reference to FIG. 12.

As a non-limiting example, Table 10 below shows an evaluation result produced by iteratively evaluating the sample runtime resource registry model shown in Table 2 described above.

TABLE 10

|  |  |  | Repository Oriented Output | |
| --- | --- | --- | --- | --- |
| URI | ACME REST implementation | Core REST implementation | ACME Repository | Core Repository |
| /docs/123 | ACME-doc | Core-doc | (a) ACME-doc | (a) Core-doc |
| /profiles | ACME-profiles | ✗ | (c) ACME-profiles | (d) 404 |
| /formats | ✗ | Core-formats | (e) 404 | (f) Core-formats |
| /relations | Core-relations | Core-relations | (g) Core-relations | (h) Core-relations |
| /unknown | ✗ | ✗ | (i) 404 | (j) 404 |

The resource registry contains internal resource registry tables that implement the resource registry model described above. The tables in the resource registry, in this example, can be created and/or updated utilizing user-specified YAML configuration parameters.

As described above, the REST extension configuration parameters can be provided by REST extension developers at implementation time, for instance, in a YAML configuration file and/or annotated in their extension application's Java code. The YAML configuration file is placed at a specified location, so it resides at a location that is accessible by the resource registry. Thus, at runtime, the resource registry can load the YAML configuration file from the specified location (1115).

At implementation time, REST extension developers can add scopes to their Java code. Thus, in some cases, some configuration information (e.g., scope) needed by the resource registry can be embedded in the requesting application's Java code. In developing the extension application, the extension application developer will annotate the Java code to indicate the scope (e.g., which repository) to the server framework. Unlike a YAML configuration file, this annotation does not have a specified location that is accessible by the resource registry at runtime. Thus, the resource registry would need to scan the Java code (which can encompass many files) of the application to locate the configuration information. To accomplish this, a Java annotation scanner may be utilized (1117). Such a Java annotation scanner is known to those skilled in the art and thus is not further described herein.

At runtime, the resource registry may operate to map or otherwise translate the REST extension configuration provided by an extension application developer at implementation time into the unified data structure of the resource registry model described above. This process, which produces internal runtime resource registry tables, need not be triggered by the REST server's receipt of an incoming REST The evaluation result can then be used by the REST server in determining whether a condition (e.g., accept a resource defining repository scope indicated in the request) is met (1131).

In some embodiments, responsive to the evaluation result (e.g., "accept") indicating that the REST request's accessing (target) repository meets the resource defining repository scope, the handling method defined for that resource is obtained (1141) and returned (1151).

In some embodiments, responsive to the evaluation result (e.g., "redirect" or "reject") indicating that the REST request's accessing repository does not meet the resource defining repository scope, the REST server may determine whether any alternate resource(s) is/are available (1133). If so, the handling method delegated for handling the alternate resource(s) (which override(s) default resource(s)) can be obtained (1143) and returned (1151). If not, an error message (e.g., "404 Not Found") can be generated and returned (1135).

Because the process described above can handle REST requests from clients to access multiple, heterogeneous repositories, the REST server can be characterized as providing polymorphic REST services to those clients. In this disclosure, "polymorphic" means that a single REST server instance running on the REST server can provide multiple ways to access heterogeneous content repositories, whether they are provisioned and/or non-provisioned.

Figure 12:
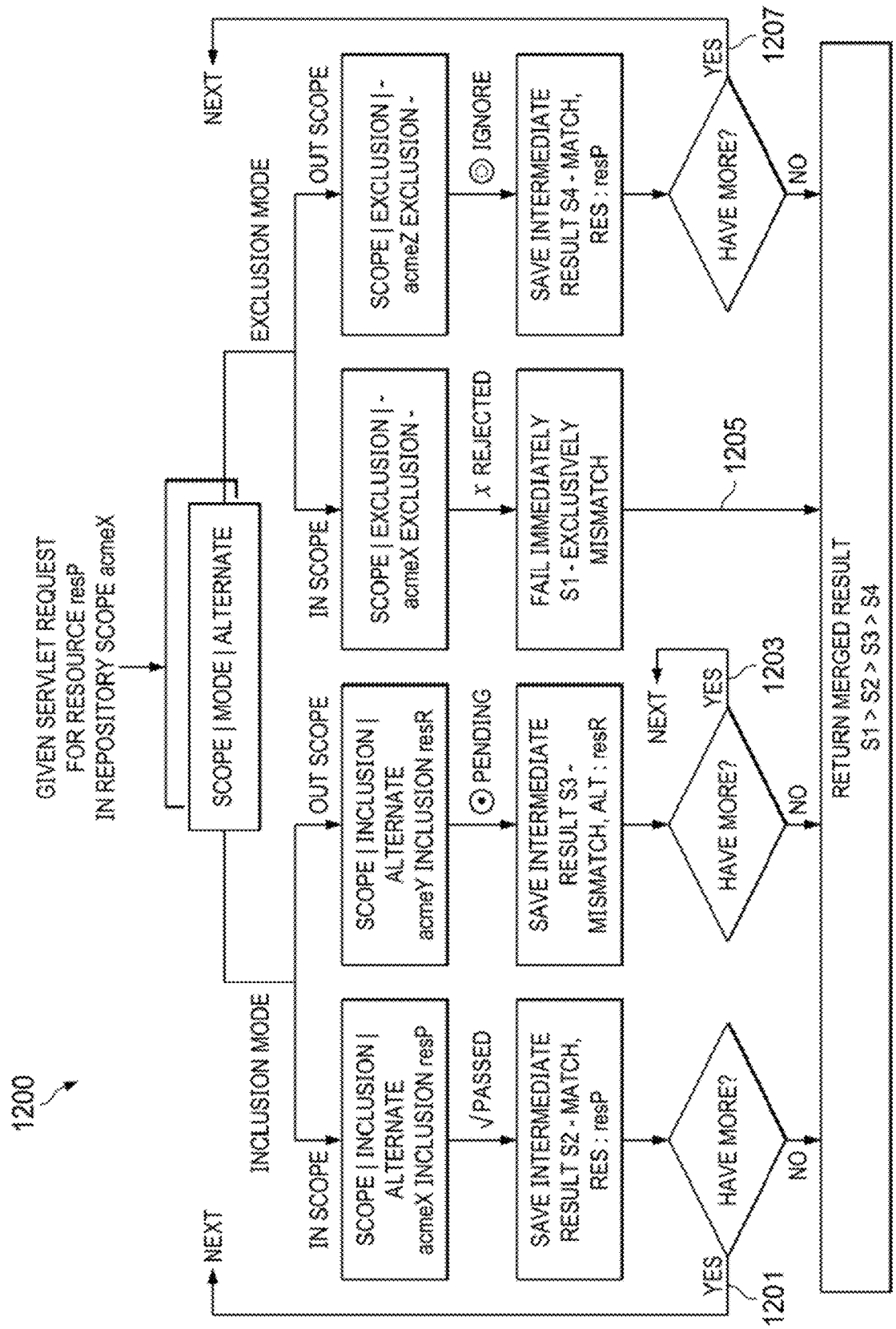
FIG. 12 is a flow diagram illustrating an example of iterative evaluation logic according to some embodiments.

FIG. 12 is a flow diagram illustrating an example iterative evaluation logic for determining an appropriate priority of handling a resource's response to a REST request according to some embodiments.

In some embodiments, when a REST request is received at a REST server's request handling component (e.g., Request Handler 260 shown in FIG. 2), the REST server may utilize a front filter to query its accessing repository type (not shown in FIG. 12) and dispatch the REST request to an evaluation component (e.g., Evaluator 270 shown in FIG. 2). In some embodiments, the evaluation component may implement process 1200 shown in FIG. 12.

In some embodiments, process 1200 may begin when an incoming request is received at the REST server. In this case, the incoming request may indicate a resource "resP" which is stored in a repository (referred to as the resource's accessing repository) of a repository type or scope "acmeX." For each matching resource registry table (whose fields are specified by the unified resource registry model and at least one of the fields contains a value that matches what's indicated in the incoming request), process 1200 will determine their priorities based on the following logic.

If a specific resource registry model definition "[scope=acmeX, mode=inclusion, alternate=resP]" can be found in a resource registry table, the evaluation is "passed." This intermediate result "accepting resP" is saved and a corresponding evaluation result is set to a priority "S2." In some embodiments, process 1200 can evaluate all the matching resource registry tables against the same resource registry model definition "[scope=acmeX, mode=inclusion, alternate=resP]" iteratively (1201) until no more matching resource registry tables would need to be evaluated.

In some embodiments, if a specific resource registry model definition "[scope=acmeY, mode=inclusion, alternate=resR]" can be found in a resource registry table, the evaluation is "pending." This intermediate result "redirecting to resR" is saved and a corresponding evaluation result is set to a priority "S3." Again, process 1200 can evaluate all the matching resource registry tables against the same resource registry model definition "[scope=acmeY, mode=inclusion, alternate=resR]" iteratively (1203) until no more matching resource registry tables would need to be evaluated.

In some embodiments, if a specific resource registry model definition "[scope=acmeX, mode=exclusion, alternate=]" can be found in a resource registry table, the evaluation is "rejected" (because the resource registry model definition specifies that when a requested repository is of the "acmeX" type, the "exclusion" mode should be applied and, in this case, the incoming request does indicate that the requested repository is of the "acmeX" type). This result is returned immediately (1205) and a corresponding evaluation result is set to a priority "S1." At this time, process 1200 will stop iterating other matching resource registry tables.

In some embodiments, if a specific resource registry model definition "[scope=acmeZ, mode=exclusion, alternate=] can be found in a resource registry table, the evaluation is "ignored." This intermediate result "accepting resP" is saved and a corresponding evaluation result is set to a priority "S4." Process 1200 can evaluate all the matching resource registry tables against the same resource registry model definition "[scope=acmeZ, mode=exclusion, alternate=] iteratively (1207) until no more matching resource registry tables would need to be evaluated.

After the iteration terminates, the evaluation component has knowledge of the priories of all the matching resources (which, in the example of FIG. 12, are prioritized in the order of S1, S2, S3, and S4), and returns the evaluation results as prioritized by this order (e.g., "rejected," "accepting resP," "redirecting to resR," "accepting resP"). In some embodiments, the resource handling method for the highest priority one will then be obtained and returned to reject, accept, or redirect the incoming request.

Embodiments disclosed herein can provide many advantages. For example, the REST server is able to self-manage REST API access for heterogeneous repositories. The REST server is also able to fallback to an overridden resource if a new resource is not available in a target repository. Further, the REST server's horizontal scalability is merely related to the request throughput and is not related to the repository type. Additionally, the REST server can be the only entity that communicates with the underlying content server or repository. This feature can streamline the overall architecture and increase the performance of the content server (e.g., more efficient and faster network communications between the REST server and the content server).

Figure 13:
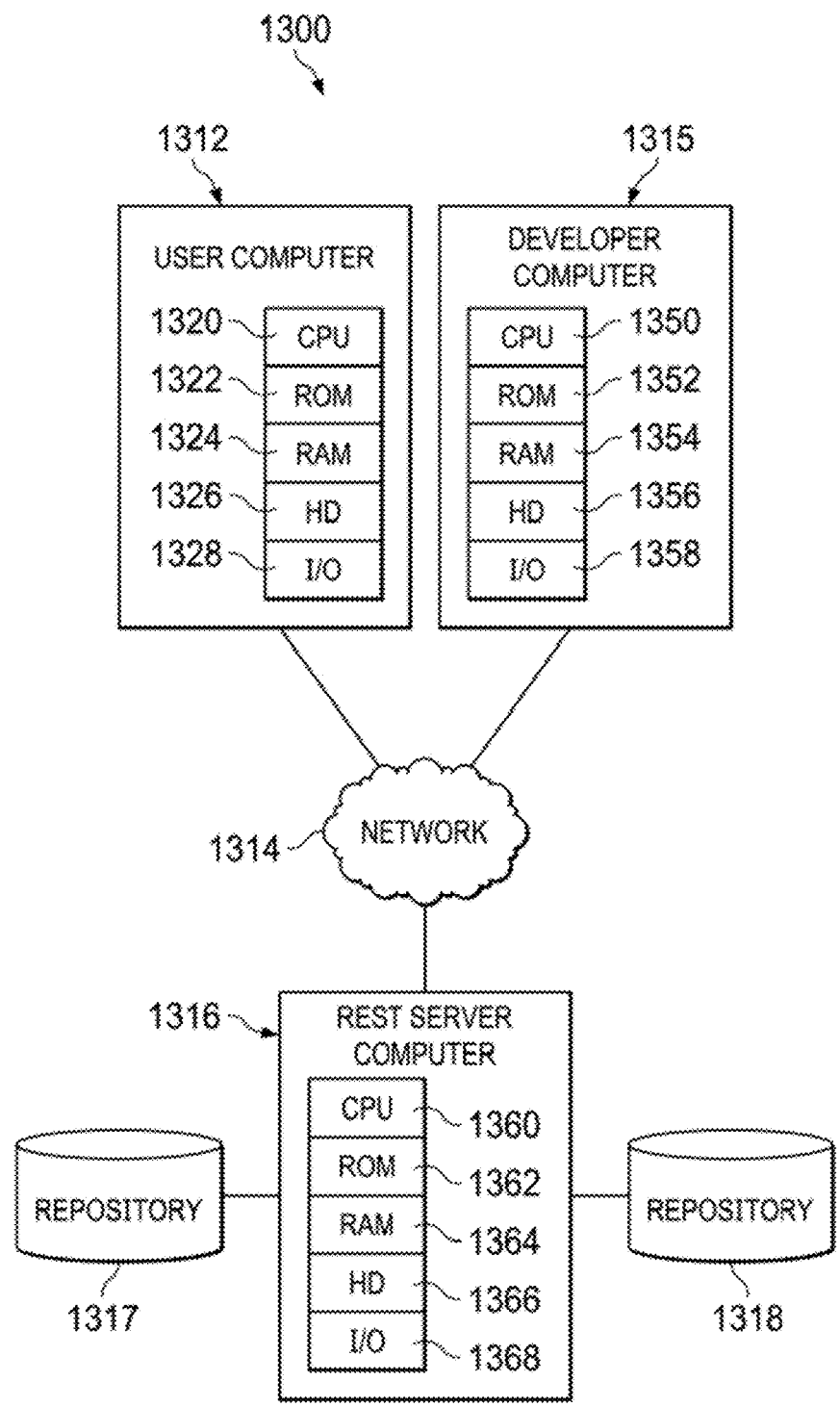
FIG. 13 depicts a diagrammatic representation of an example of an enterprise computing environment where embodiments disclosed can be implemented.

FIG. 13 illustrates an exemplary architecture for network computing environment 1300 that includes network 1314 that can be bi-directionally coupled to enterprise user computer 1312, developer computer 1315, and REST server computer 1316. REST server computer 1316 can be bi-directionally coupled to repositories 1317, 1318. Network 1314 may represent a combination of wired and wireless networks that network computing environment 1300 may utilize for various types of network communications known to those skilled in the art.

For the purpose of illustration, a single system is shown for each of enterprise user computer 1312, developer computer 1315, and REST server computer 1316. However, within each of enterprise user computer 1312, developer computer 1315, and REST server computer 1316, a plurality of computers (not shown) may be interconnected to each other over network 1314. For example, a plurality of enterprise user computers 1312 and a plurality of developer computers 1315 may be coupled to network 1314. Enterprise user computers 1312 may include data processing systems for communicating with REST server computer 1316. Developer computers 1315 may include data processing systems for individuals whose jobs may require them to configure REST services used by extension applications running on enterprise user computers 1312 in network computing environment 1300.

Enterprise user computer 1312 can include central processing unit ("CPU") 1320, read-only memory ("ROM") 1322, random access memory ("RAM") 1324, hard drive ("HD") or storage memory 1326, and input/output device(s) ("I/O") 1328. I/O 1329 can include a keyboard, monitor, printer, electronic pointing device (e.g., mouse, trackball, stylus, etc.), or the like. Enterprise user computer 1312 can include a desktop computer, a laptop computer, a personal digital assistant, a cellular phone, or nearly any device capable of communicating over a network. Developer computer 1315 may be similar to enterprise user computer 1312 and can comprise CPU 1350, ROM 1352, RAM 1354, HD 1356, and I/O 1358.

Likewise, REST server computer 1316 may include CPU 1360, ROM 1362, RAM 1364, HD 1366, and I/O 1368. REST server computer 1316 may include one or more backend systems configured for providing a variety of services (e.g., content services) to enterprise user computers 1312 over network 1314. In the example of FIG. 13, REST server computer 1316 is communicatively connected to backend systems such as repositories 1317, 1318. Many other alternative configurations are possible and known to skilled artisans.

Each of the computers in FIG. 13 may have more than one CPU, ROM, RAM, HD, I/O, or other hardware components. For the sake of brevity, each computer is illustrated as having one of each of the hardware components, even if more than one is used. Each of computers 1312, 1315, and 1316 is an example of a data processing system. ROM 1322, 1352, and 1362; RAM 1324, 1354, and 1364; HD 1326, 1356, and 1366; and content repositories 1317, 1318 can include media that can be read by CPU 1320, 1350, or 1360.

Therefore, these types of memories include non-transitory computer-readable storage media. These memories may be internal or external to computers 1312, 1315, or 1316.

Portions of the methods described herein may be implemented in suitable software code that may reside within ROM 1322, 1352, or 1362; RAM 1324, 1354, or 1364; or HD 1326, 1356, or 1366. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by distributed networked systems, components, and/or circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method, comprising:
   receiving, by a server computer from a client device, a Representational State Transfer (REST) request to access repositories;
   determining, by the server computer, resources that are available to service the REST request, the determining including querying a resource registry using mapping information contained in the REST request and receiving tables from the resource registry, the tables having a unified data structure that specifies a set of fields, the set of fields containing REST service configuration parameter values for resources that match the mapping information;
   iteratively evaluating, by the server computer, the tables until all the resources contained therein have been evaluated; and
   determining, by the server computer based at least in part on a result from the evaluating, whether to reject, accept, or redirect the request from the client device to access the repositories.

2. The method according to claim 1, wherein the tables are iteratively evaluated against a resource registry model definition that specifies a repository scope for a target repository and a mode for inclusion or exclusion of the target repository.

3. The method according to claim 1, wherein each of the tables has a field for specifying a repository type or scope.

4. The method according to claim 1, further comprising:
   creating, at runtime internally by the server computer, a resource registry model for describing the resources contained in the tables uniformly.

5. The method according to claim 4, wherein a resource available to service the REST request is provisioned per a REST extension configuration, the method further comprising:
   translating or mapping the REST extension configuration into the resource registry model.

6. The method according to claim 5, wherein the translating or mapping comprises transforming user-specified configuration parameter values for the REST extension configuration into field values for the set of fields of the unified data structure.

7. The method according to claim 1, further comprising:
   generating or updating the tables; and
   storing the tables in memory for internal use by the server computer.

8. A system, comprising:
   a processor;
   a non-transitory computer-readable medium; and
   stored instructions translatable by the processor for:
      receiving, from a client device, a Representational State Transfer (REST) request to access repositories;
      determining resources that are available to service the REST request, the determining including querying a resource registry using mapping information contained in the REST request and receiving tables from the resource registry, the tables having a unified data structure that specifies a set of fields, the set of fields containing REST service configuration parameter values for resources that match the mapping information;
      iteratively evaluating the tables until all the resources contained therein have been evaluated; and determining, based at least in part on a result from the evaluating, whether to reject, accept, or redirect the request from the client device to access the repositories.

9. The system of claim 8, wherein the tables are iteratively evaluated against a resource registry model definition that specifies a repository scope for a target repository and a mode for inclusion or exclusion of the target repository.

10. The system of claim 8, wherein each of the tables has a field for specifying a repository type or scope.

11. The system of claim 8, wherein the stored instructions are further translatable by the processor for:
creating, at runtime, a resource registry model for describing the resources contained in the tables uniformly.

12. The system of claim 11, wherein a resource available to service the REST request is provisioned per a REST extension configuration and wherein the stored instructions are further translatable by the processor for:
translating or mapping the REST extension configuration into the resource registry model.

13. The system of claim 12, wherein the translating or mapping comprises transforming user-specified configuration parameter values for the REST extension configuration into field values for the set of fields of the unified data structure.

14. The system of claim 8, wherein the stored instructions are further translatable by the processor for:
generating or updating the tables; and
storing the tables in memory for internal use by the system.

15. A computer program product comprising a non-transitory computer-readable medium storing instructions translatable by a processor for:
receiving, from a client device, a Representational State Transfer (REST) request to access repositories;
determining resources that are available to service the REST request, the determining including querying a resource registry using mapping information contained in the REST request and receiving tables from the resource registry, the tables having a unified data structure that specifies a set of fields, the set of fields containing REST service configuration parameter values for resources that match the mapping information;
iteratively evaluating the tables until all the resources contained therein have been evaluated; and
determining, based at least in part on a result from the evaluating, whether to reject, accept, or redirect the request from the client device to access the repositories.

16. The computer program product of claim 15, wherein the tables are iteratively evaluated against a resource registry model definition that specifies a repository scope for a target repository and a mode for inclusion or exclusion of the target repository.

17. The computer program product of claim 15, wherein each of the tables has a field for specifying a repository type or scope.

18. The computer program product of claim 15, wherein the instructions are further translatable by the processor for:
creating, at runtime, a resource registry model for describing the resources contained in the tables uniformly.

19. The computer program product of claim 18, wherein a resource available to service the REST request is provisioned per a REST extension configuration and wherein the instructions are further translatable by the processor for:
translating or mapping the REST extension configuration into the resource registry model.

20. The computer program product of claim 19, wherein the translating or mapping comprises transforming user-specified configuration parameter values for the REST extension configuration into field values for the set of fields of the unified data structure.

* * * * *